UNITED STATES PATENT OFFICE.

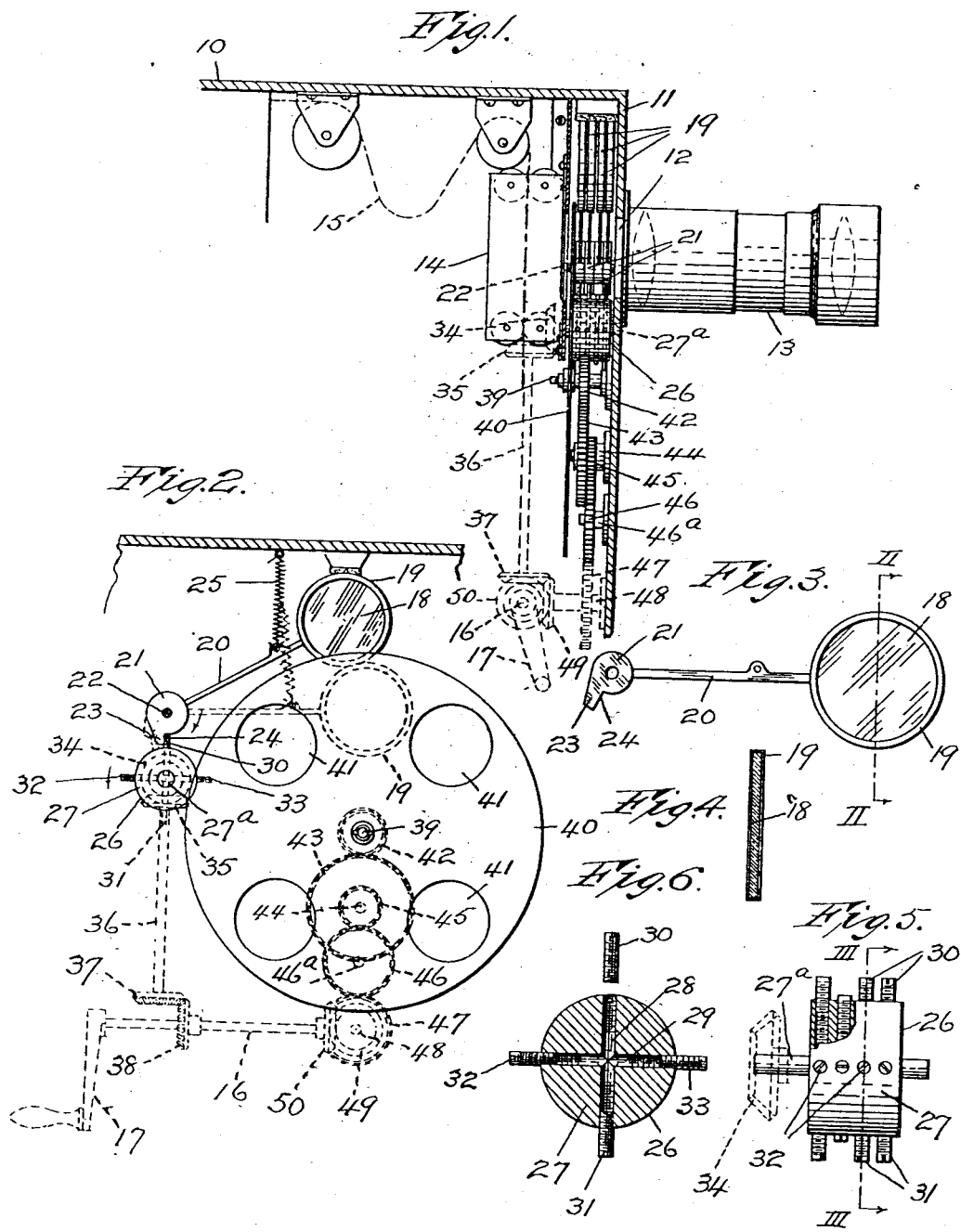

FREDERICK W. HOCHSTETTER, OF NEW YORK, N. Y., ASSIGNOR TO H. P. PATENTS AND PROCESSES COMPANY, INC., A CORPORATION OF NEW YORK.

SHUTTER FOR MOVING-PICTURE MACHINES.

1,094,148.  Specification of Letters Patent.  Patented Apr. 21, 1914.

Application filed November 11, 1913. Serial No. 800,317.

*To all whom it may concern:*

Be it known that I, FREDERICK W. HOCHSTETTER, a subject of the Emperor of Germany, and a resident of New York, county and State of New York, have invented a certain new and useful Improvement in Shutters for Moving-Picture Machines, of which the following is a full, clear, and exact specification.

This invention relates to a class of devices adapted to be used in conjunction with moving picture machines.

My invention has for its object primarily to provide a shutter designed to be especially utilized in conjunction with a camera for photographing living objects, or scenery for the production of moving pictures in their natural colors as well as being adapted for use in conjunction with a projecting machine for exhibiting the pictures in corresponding colors, and wherein is employed a number of transparent color plates which are mounted in forms of brackets pivotally held so as to be intermittently swung in succession, or separately before the exposure window of the machine for passage of light therethrough.

Other objects of the invention are to provide a disk having a plurality of spaced openings therethrough, and which is revolved simultaneously with the operation of the brackets carrying the transparent plates; to provide a form of rotatable trip for intermittently swinging the brackets to register the colored plates with the exposure window of the machine; to provide means for rotating the trip; and to provide means for revolving the disk from a common drive shaft.

With these and other objects in view, the invention will be hereinafter more particularly described with reference to the accompanying drawing which forms a part of this specification, and will then be pointed out in the claims at the end of the description.

In the drawing, Figure 1 is a fragmentary sectional view showing a part of a moving picture machine with one form of shutter embodying my invention applied thereto. Fig. 2 is an enlarged front elevation of the device. Fig. 3 is an enlarged side elevation of one of the swinging brackets carrying a transparent plate employed in the shutter. Fig. 4 is a section taken on the line II—II of Fig. 3. Fig. 5 is an enlarged side elevation, partly broken away, of the trip used in the device, and Fig. 6 is a section, partly in detail, taken on the line III—III of Fig. 5.

The device, or shutter is adapted to be used in conjunction with a machine for projecting moving pictures in colors upon a screen, or may be employed upon a camera for photographing living objects, or scenery in their natural colors. The machine may be of the usual, or any preferred form having a casing 10 in the front wall 11 of which is an exposure window 12. To the casing 10 at its exposure window is secured a telescopic lens barrel 13, and interiorly of the casing is a framing device 14 provided with the usual windows, not shown, which are in register with the exposure window 12. The framing device serves to intermittently guide in the customary manner a transparent film, as 15, before said windows.

The mechanism of the machine and the parts of my shutter are arranged so as to be preferably operated by a common drive shaft 16 which is manually rotated by a crank handle 17.

The shutter has a plurality of plates of glass, or other transparent material, as 18, which may be of one, or a number of the primary colors as occasion may require for the production and exhibition of the pictures in their natural colors. Each of the transparent plates 18 is mounted in a frame 19 provided upon one end of a bracket or arm 20, and while four of these brackets and plates are shown in the drawing it will be understood that a greater or less number may be used. On the opposite end of each of the brackets 20 is a circular plate 21 which is rotatable upon a shaft 22 held in the casing of the machine at a part thereof to permit each of the brackets to be swung so that its transparent plate may be intermittently registered with the exposure window of the casing 10, and projecting downwardly from a corresponding part of the periphery of each of the circular plates 21 is a lug 23 having a straight edge to provide a shoulder 24. The brackets 20 are normally disposed so that the transparent plates 21 are positioned at the top of the casing 10 to be free from registration with the exposure window 12, and serving to yieldingly retain the brackets in these positions, connected to each of the brackets intermediate its ends is one end of a spiral spring 25 having its other end connected to one of the side walls of the casing 10.

Serving to intermittently swing one or more of the brackets singly or collectively, or serving to swing a desired number of the brackets consecutively for moving the transparent plates thereof into register with the exposure window 12, I provide a form of trip, as 26. The trip 26 has a drum or hub 27 held upon a shaft 27ª which is journaled in the casing 10 of the machine. Extending centrally through the hub 27 from diametrically opposite parts of its periphery are four threaded spaced passages 28 which are arranged in a row longitudinally of the hub, and also extending centrally through the hub from diametrically opposite parts of its periphery transversely with respect to the passages 28 is another row of four threaded spaced passages 29. In both ends of each of the passages 28 are screwed threaded pins or bolts 30 and 31, each having a slotted end whereby it may be suitably adjusted with relation to the periphery of the hub. Also in both ends of each of the passages 29 are screwed threaded pins, or bolts 32 and 33, each having a slotted end so that it may be suitably adjusted relatively to the periphery of the hubs. The rows of bolts 30, 31, 32, 33 are thus adapted to be adjusted to extend in spoke fashion from the hub 27, and while I employ in the device illustrated four rows of the bolts, it will be understood that additional rows of the bolts may be used in forms of the shutter as occasion requires. The trip is arranged so that one of the bolts of each row will be normally in the path of movement of one of the lugs 23 of the circular plates of the brackets 20 so that the bolts will contact in succession with the shoulders of the lugs when the trip is revolved.

For the purpose of imparting rotation to the trip 26 when the drive shaft is driven, on the shaft 27ª of the trip is held a bevel gear 34 which is in mesh with a bevel gear 35 held upon the upper end of a shaft 36 provided in the casing of the machine. On the lower end of the shaft 36 is a second bevel gear 37 which is in mesh with a bevel gear 38 held upon the drive shaft 16. Thus when the drive shaft is rotated the trip 26 will be accordingly revolved for intermittently contacting the bolts 30, 31, 32, 33 with the shoulder of the lugs 23 of the circular plates of the brackets. The brackets 20 will then be swung upon their pivots against the tension of the springs 25 so as to throw the transparent plates 18 intermittently in register with the exposure window 12. All of the brackets will thereby be intermittently operated simultaneously, but by suitably adjusting one, or more of the bolts 30, 31, 32, 33 in the passages of the hub of the trip one or more of the brackets may be intermittently swung singly or collectively, or a desired number of the brackets may be swung consecutively for moving the transparent plates in register with the exposure window. In this manner transparent plates of a single color, or a series of different colors, or various combinations of colors may be advantageously employed in conjunction with the shutter.

In order to cut-off the light projected through the exposure window 12 and through the windows of the framing device when the transparent plates are not in register with the windows, upon a short shaft, or stud 39 journaled in the front wall of the casing 10 is held a revoluble disk 40 having a number of apertures 41 therethrough. The apertures 41 are relatively spaced apart so that each aperture will register with each of the transparent plates 18 when registered with the exposure window 12 of the casing, and serving as means to revolve said disk at a speed to accomplish this, upon the stud 39 is held a pinion 42 which is in mesh with a gear 43 held upon a stud 44 journaled in the front wall of the casing. Also upon the stud 44 is a pinion 45 in mesh with an idler 46 which is freely rotatable upon a stud 46ª projecting from the front wall of the casing, and this idler is in mesh with a gear 47 held upon a short shaft 48 also journaled in the front wall of the casing. On the free end of the shaft 48 is a bevel gear 49 which meshes with a bevel gear 50 held upon the drive shaft 16. By properly gearing the disk 40 in this manner it will be revolved in unison with the operation of the trip 26 and the brackets 20 for accurately registering the transparent plates 18 and the apertures 41 of the disk intermittently with the exposure windows of the machine during the photographing of living objects, or scenery upon a film, or during the projecting of the pictures upon a screen.

In the foregoing description I have embodied the preferred form of my invention, but I do not wish to be understood as limiting myself thereto as I am aware that modifications may be made therein without departing from the principle or sacrificing any of the advantages of this invention, therefore I reserve to myself the right to make such changes as fairly fall within the scope of the appended claims.

Having thus described my invention, I claim as new and desire to secure by Letters Patent:—

1. In a shutter of the character described, the combination with a casing having an exposure window, of a plurality of brackets, each carrying a transparent plate, said brackets being pivoted in the casing so as to be swung for intermittently registering the transparent plates with the exposure window, a drive shaft, and means operatively connected to the drive shaft and engaging the brackets for intermittently swinging the brackets in succession to register the transparent plates correspondingly with the exposure window when the drive shaft is rotated.

2. In a shutter of the character described, the combination with a casing having an exposure window, of a bracket carrying a transparent plate, said bracket being pivoted in the casing so as to be swung for intermittently registering the transparent plate with the exposure window, a drive shaft, and means operatively connected to the drive shaft and engaging the bracket, said means being adapted to be adjusted for intermittently swinging the bracket to register the transparent plate with the exposure window when the drive shaft is rotated.

3. In a shutter of the character described, the combination with a casing having an exposure window, of a plurality of brackets, each carrying a transparent plate, said brackets being pivoted in the casing so as to be swung for intermittently registering the transparent plates with the exposure window, a drive shaft, a trip provided in the casing and movably engaging the brackets, and means operatively connected to the drive shaft and to the trip for operating the trip to intermittently swing a number of the brackets in unison so as to register the transparent plates correspondingly with the exposure window when the drive shaft is rotated.

4. In a shutter of the character described, the combination with a casing having an exposure window, of a plurality of brackets, each carrying a transparent plate, said brackets being pivoted in the casing so as to be swung for intermittently registering the transparent plates with the exposure window, a drive shaft, an adjustable trip provided in the casing and movably engaging the brackets, and means operatively connected to the drive shaft and to the trip for operating the trip to intermittently swing the brackets in succession so as to register the transparent plates correspondingly with the exposure window when the drive shaft is rotated.

5. In a shutter of the character described, the combination with a casing having an exposure window, of a plurality of brackets, each carrying a transparent plate, said brackets being pivoted in the casing and yieldingly retained so as to be swung for intermittently registering the transparent plates with the exposure window, a drive shaft, and means operatively connected to the drive shaft and engaging the brackets, said means being adapted to be adjusted for intermittently swinging one of the brackets or intermittently swinging a number of the brackets in succession to register the transparent plates correspondingly with the exposure window when the drive shaft is rotated.

6. In a shutter of the character described, the combination with a casing having an exposure window, of a bracket, carrying a transparent plate, said bracket being pivoted in the casing so as to be swung for intermittently registering the transparent plate with the exposure window, a drive shaft, means operatively connected to the drive shaft and engaging the bracket for intermittently swinging the bracket to register the transparent plate with the exposure window when the drive shaft is rotated, a disk having an aperture therethrough, said disk being revolubly held in the casing so that its aperture will register with the transparent plate when swung in register with the exposure window, and means connected to the drive shaft and to the disk for revolving the disk when the drive shaft is driven.

7. In a shutter of the character described, the combination with a casing having an exposure window, of a plurality of brackets, each carrying a transparent plate, said brackets being pivoted in the casing so as to be swung for intermittently registering the transparent plates with the exposure window, a drive shaft, means operatively connected to the drive shaft and engaging the brackets, said means being adapted to be adjusted for intermittently swinging the brackets in succession to register the transparent plates correspondingly with the exposure window when the drive shaft is rotated, a disk having a number of spaced apertures therethrough, said disk being revolubly held in the casing so that each of its openings will register with one of the transparent plates when swung in register with the exposure window, and means connected to the drive shaft and to the disk for revolving the disk when the drive shaft is driven.

8. In a shutter of the character described, the combination with a casing having an exposure window, of a plurality of brackets, each carrying a transparent plate, said brackets being pivoted in the casing so as to be swung for intermittently registering the transparent plates with the exposure window, a drive shaft, a trip provided in the casing and movably engaging the brackets, means operatively connected to the drive shaft and to the trip for operating the trip to intermittently swing the brackets in succession to register the transparent plates correspondingly with the exposure window when the drive shaft is rotated, a disk having a number of spaced apertures therethrough, said disk being revolubly held in the casing so that each of its openings will register with one of the transparent plates when swung in register with the exposure window, and means connected to the drive shaft and to the disk for revolving the disk when the drive shaft is driven.

9. In a shutter of the character described, the combination with a casing having an exposure window, of a plurality of brackets, each carrying a transparent plate, said brackets being pivoted in the casing so as to be swung for intermittently registering the transparent plates with the exposure window, a drive shaft, an adjustable trip provided in the casing and movably engaging the brackets, means operatively connected to the drive shaft and to the trip for operating the trip to intermittently swing the brackets in succession so as to register the transparent plates correspondingly with the exposure window when the drive shaft is rotated, a disk having a number of spaced apertures therethrough, said disk being revolubly held in the casing so that each of its openings will register with one of the transparent plates when swung in register with the exposure window, and gearing for revolving the disk when the drive shaft is driven.

10. In a shutter of the character described, the combination with a casing having an exposure window, of a plurality of brackets, each carrying a transparent plate, said brackets being pivoted in the casing and yieldingly retained so as to be swung for intermittently registering the transparent plates with the exposure window, a drive shaft, means operatively connected to the drive shaft, and engaging the brackets, said means being adapted to be adjusted for intermittently swinging one of the brackets or intermittently swinging a number of the brackets in succession to register the transparent plates correspondingly with the exposure window when the drive shaft is rotated, a disk having a number of spaced apertures therethrough, said disk being revolubly held in the casing so that each of its openings will register with one of the transparent plates when swung in register with the exposure window, and gearing for revolving the disk when the drive shaft is driven.

This specification signed and witnessed this tenth day of November, A. D., 1913.

FREDERICK W. HOCHSTETTER.

Witnesses:
ROBT. B. ABBOTT,
M. DERMODY.